United States Patent [19]

Ohora et al.

[11] Patent Number: 5,359,695
[45] Date of Patent: Oct. 25, 1994

[54] SPEECH PERCEPTION APPARATUS

[75] Inventors: Yasunori Ohora, Kawasaki; Koichi Miyashiba, Yokohama, both of Japan

[73] Assignee: Canon Kabushiki Kaisha, Tokyo, Japan

[21] Appl. No.: 137,816

[22] Filed: Oct. 19, 1993

Related U.S. Application Data

[63] Continuation of Ser. No. 873,989, Apr. 27, 1992, abandoned, which is a continuation of Ser. No. 579,239, Sep. 6, 1990, abandoned, which is a continuation of Ser. No. 420,749, Oct. 13, 1989, abandoned, which is a continuation of Ser. No. 694,844, Jan. 25, 1985, abandoned.

[30] Foreign Application Priority Data

Jan. 30, 1984 [JP] Japan ................ 59-13422

[51] Int. Cl.⁵ ............ G10L 7/08; G10L 7/10
[52] U.S. Cl. .................. 395/2.44; 395/2.85
[58] Field of Search .......... 395/2.44, 2.85, 2.4, 395/2.6; 381/44, 48, 43

[56] References Cited

U.S. PATENT DOCUMENTS

| | | | |
|---|---|---|---|
| Re. 31,188 | 3/1983 | Pirz et al. | 381/43 |
| 3,634,759 | 1/1972 | Koshikawa | 381/48 |
| 3,639,691 | 2/1972 | Beninghof | 381/48 |
| 4,335,276 | 6/1982 | Bull et al. | 395/285 |
| 4,641,343 | 2/1987 | Holland et al. | 381/48 |
| 4,718,095 | 1/1988 | Asakawa et al. | 395/2.6 |
| 4,866,778 | 9/1989 | Baker | 395/2.44 |

*Primary Examiner*—David D. Knepper
*Attorney, Agent, or Firm*—Fitzpatrick, Cella, Harper & Scinto

[57] ABSTRACT

Speech perception is performed by obtaining similarity between an input speech and a reference speech and discriminating the input speech; selectively outputting discrimination information or color information corresponding to the similarity derived; and displaying the discrimination information or color information output selectively by a predetermined symbol or color. With this apparatus, the person who utters can know the condition of his utterance and accuracy of speech perception of the apparatus.

16 Claims, 4 Drawing Sheets

SPEECH PERCEPTION APPARATUS

This application is a continuation of application Ser. No. 07/873,989, filed Apr. 27, 1992, now abandoned, which is a continuation of application Ser. No. 07/579,239 filed Sep. 6, 1990, now abandoned, which is a continuation of application Ser. No. 07/420,749 filed Oct. 13, 1989, now abandoned, which is a continuation of application Ser. No. 06/694,844 filed Jan. 25, 1985, now abandoned.

BACKGROUND OF THE INVENTION

1. Field of the Invention

The present invention relates to a speech perception apparatus which recognizes and discriminates speech patterns.

2. Description of the Prior Art

Conventionally, in this kind of apparatuses, a reference speech patterns of a person is preliminarily input. This input speech signal is subjected to a predetermined conversion, then several feature vectors are extracted and combinations of the feature vectors thus obtained are registered as reference feature patterns in a registration file.

The feature vector will now be described. As a quantity representing the voice, there is a time sequence of a frequency spectrum of the speech waveform, or the like. A specific feature of the speech which is extracted from this time sequence is the feature quantity. Since the feature is ordinarily represented by a plurality of elements, it is indicated by a vector. This vector is the feature vector. For example, a feature is indicated by a ratio between the energies of speech in the high and low frequency bands, which energies vary with the elapse of time. On one hand, a feature of which the data which become a reference with respect to a voice of, e.g., "A" uttered by a person was converted to the feature vector is assumed to be a reference feature pattern of this person.

In addition, an input signal of character, figure or symbol from a keyboard or the like is made coordinate with a combination of the feature vector derived and is registered as a reference feature pattern in the registration file if necessary.

Next, when the apparatus recognizes an ordinary speech, the feature vector is extracted due to a similar conversion as mentioned above and compares it with the reference feature pattern in the registration file to calculate similarity. The apparatus then selects the feature vector which is most analogous to the input speech from among the reference feature patterns, thereby recognizing the speech. In the calculation of similarity, for instance, the distance between the feature vector and the reference vector is obtained and it is assumed that the similarity is high as the distance becomes small. On the other hand, in the case where there are a plurality of reference feature patterns regarding one speech and they are distributed, the distance from the center of the distribution may be obtained or the speech may be examined to see if it exists in the distribution or not.

Therefore, the person who utters believes that the uniformity or reproductivity of the utterance of himself is correct for the interval when, for instance, the display character of which the result of perception was coded represents the sound of utterance; however, he knows for the first time that the utterance; of himself deviated from the reference pattern which has already been registered only when the display character differs from the utterance. However, human speeches also largely depend upon various human conditions (condition of the throat and the like). Therefore, for example, when the apparatus erroneously recognizes the speech, this often means that the speech could not be recognized since it had gradually deviated from the speech registered or that the speech changed as largely as it is erroneously recognized. Further, time has already elapsed since the speech was erroneously recognized, so that it is now difficult for the person who utters to remember the feeling of the speech at the time of registration. It is therefore often necessary to register the speeches again.

SUMMARY OF THE INVENTION

It is an object of the present invention to eliminate the foregoing drawbacks.

Another object of the invention is to improve a speech perception apparatus.

Still another object of the invention is to provide a speech perception apparatus which allows the person who utters to always maintain the utterance with good reproductivity by displaying the state of speech perception of the apparatus, thereby enabling operative speech to be always input to the apparatus.

Still another object of the invention is to provide a speech perception apparatus in which the weighted mean of the states of speech recognition of the apparatus is obtained, thereby knowing accurancy of the speech recognition and enabling operative to be input.

Other objects and features of the present invention will be apparent from the following detailed description in conjunction with the accompanying drawings.

DETAILED OF DESCRIPTION OF THE PREFERRED EMBODIMENTS

Figure 1:
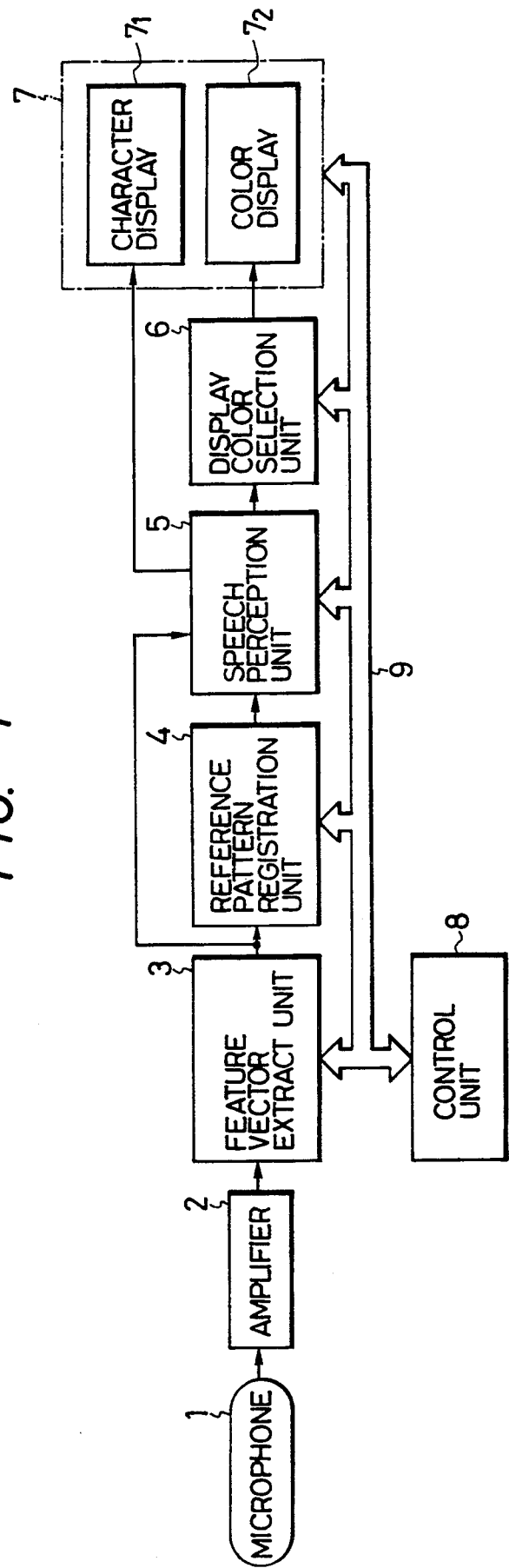
FIG. 1 is a block diagram showing an arrangement of the main function of one embodiment according to the present invention.

A speech perception apparatus of one embodiment according to the present invention will now be described in detail hereinbelow with reference to the drawings. FIG. 1 is a block diagram showing an arrangement of the main function of the speech perception apparatus of the embodiment. In the diagram, a reference numeral 1 denotes a microphone for converting a speech input to an electrical signal; 2 is an amplifier for amplifying the speech signal which was converted to the electrical signal; 3 a feature vector extraction unit for extracting various feature vectors by performing the spectral converting process to the amplified speech signal; 4 a reference pattern registration unit for registering the feature vectors extracted by the feature vector extraction unit 3 as reference feature patterns upon registration of the reference speeches; 5 a speech perception unit which compares the feature vectors extracted by the feature vector extraction unit 3 with the reference feature pattern vectors read out from the reference pattern registration unit 4 upon recognition of an ordinary speech and calculates the similarities among them, then discriminates the relevant word or relevant phoneme with regard to the feature vector having the highest similarity and codes it; 6 a display color selection unit which classifies the similarities calculated by the speech recognition unit 5 in the levels of a plurality of stages, then selects and outputs the color information corresponding thereto in accordance with the class of the similarity calculated; 7 a display unit consisting of a character display $7_1$ for displaying the character figure or symbol which was discriminated and coded by the speech perception unit 5 and a color display $7_2$ for converting the color information selected by the display color selection unit 6 to the visual information and displaying it; 8 a control unit for controlling the speech perception apparatus; and 9 a control bus.

Figure 2:
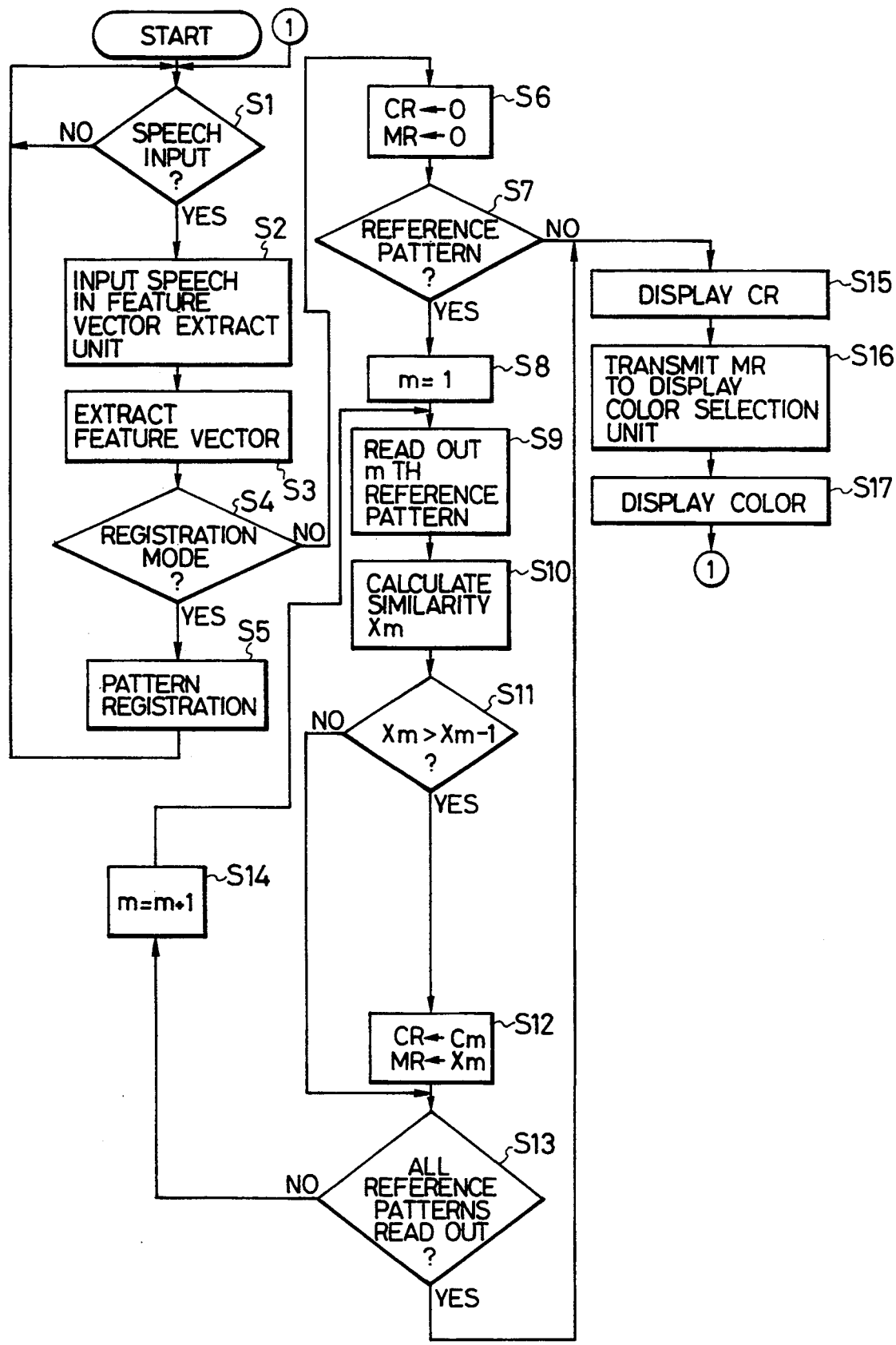
FIG. 2 is a flow chart for explaining the operation of a control unit shown in FIG. 1.

FIG. 2 is a flow chart for explaining the operation of the arrangement shown in FIG. 1. In step S1, a check is made to see if a speech is input from the microphone 1 or not. If a speech is inputted, step S2 follows. If not, the apparatus waits until a speech is input. In step S2, the speech input from the microphone 1 is amplified and is input to the feature vector extraction unit 3. In step S3, the feature vectors of the input speech are extracted due to predetermined spectral conversion. In step S4, a check is made to see if the apparatus is in the registration mode or not. This apparatus has the registration mode of the reference speech and the recognition mode of an ordinary speech and has been preselected to either mode by switching means (not shown). In case of the registration mode, step S5 follows and a set of feature vectors extracted are registered as a reference feature pattern in the reference feature pattern registration unit. Then, the process routine returns to step S1 and the apparatus waits until the next speech is input. In the speech input, a certain degree of recognition can be generally performed by merely analyzing its feature vectors. However, since individual human speech has its own feature, the embodiment adopts a registration method of reference feature patterns in order to ensure high reliability in the speech reception.

When it is determined in step S4 that the apparatus is not in the registration mode, it is in the recognition mode of an ordinary speech. In step S6, the contents of a code register CR for storing the codes of phonemes or words and of a register MR for storing the maximum value of similarity are initialized to 0. In step S7, a check is made to see if the reference feature patterns already are registered or not. When the registered patterns exist, step S8 follows and a variable m representing which number of reference pattern is read out is initialized. Then, the m-th reference feature pattern is read out from the registration unit 4 (in step S9). In step S10, the feature vector extracted in step S3 is compared with the reference feature pattern read out in step S9, thereby calculating the similarity $X_m$. This similarity is obtained by calculating the difference between the two vectors as mentioned above. When it is now assumed that the similarity calulated with regard to the reference feature pattern read out for the preceding comparison is $X_{m-1}$, a comparison is made to check the magnitudes of the present similarity $X_m$ and of the previous similarity $X_{m-1}$ in step S11. When $X_m$ is larger than $X_{m-1}$, step S12 follows and a code $C_m$ of the phoneme or word which has been registered relative to the relevant reference pattern is transmitted to the register CR, while the present similarity $X_m$ is transferred to the register MR. If the answer is NO in step S11, step S13 follows. Namely, the code $C_m$ of the phoneme, word or the like which is determined to be most similar unit the present time is held in the register CR due to the foregoing processes, while the value $X_m$ of similarity at that time is held in the register MR, respectively. In step S13, a check is made to see if all reference patterns were read out or not. If the answer is NO, a value of m is increased by one in step S14. Then, the process routine returns to step S9. When the final reference pattern registered is soon read out due to the discrimination on step S13 by repeating these processes, or when the answer is NO in step S7, step S15 follows. In step S15, the content of the register CR is transferred to the character display $7_1$, thereby displaying the corresponding character or the like. In step S16, the content of the register MR is transferred to the display color selection unit 6. In the display color selection unit 6, for instance, the maximum value of the similarity $X_m$ is set to 100 and the similarity $X_m$ is classified into the levels. Namely, the display color is determined to be red when $X_m$ lies between 0 to 59, yellow when $X_m$ lies between 60 to 79, and blue when $X_m$ lies between 80 to 100. In step S17, this selected color information is sent to the color display $7_2$, so that the corresponding color is displayed. The process routine then returns to step S1 and waits until the next speech is input. In this way, the person who utters can always monitor the condition of his utterance. Since blue is displayed when the similarity $X_m$ is over 80, the person who utters may continue the speech input in relief. If the person who utters is familiar with such a color display method, he will be able to easily handle the apparatus rather than checking the correct or erroneous perception one by one by observing the display characters directly. When the similarity $X_m$ lies within a range of 60 to 79, an attention should be paid although the perception is possible. Namely, there is a high possibility of the erroneous perception by the apparatus since the similarity in this range can be calculated even in comparison with another registration pattern. When the person who utters looks at the yellow display, it is also necessary to pay an attention to the display character or the like of the result of perception. By checking the display character or the like, he can immediately know the phoneme or word having low similarity. The person who utters can know the devoted of his utterance before it largely deviates from the utterance registered with regard to the utterance of such phoneme or word, so that he can soon correct his utterance.

Figure 3:
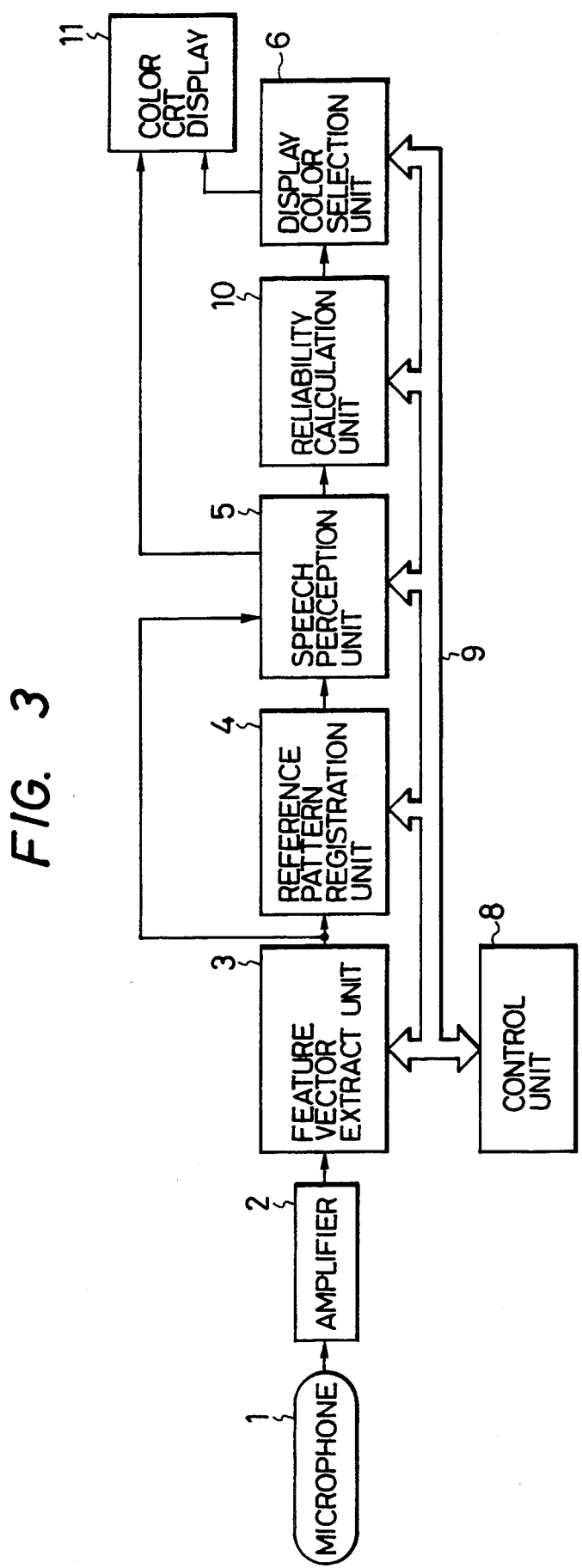
FIG. 3 is a block diagram showing an arrangement of the main function of another embodiment according to the present invention.
Figure 4:
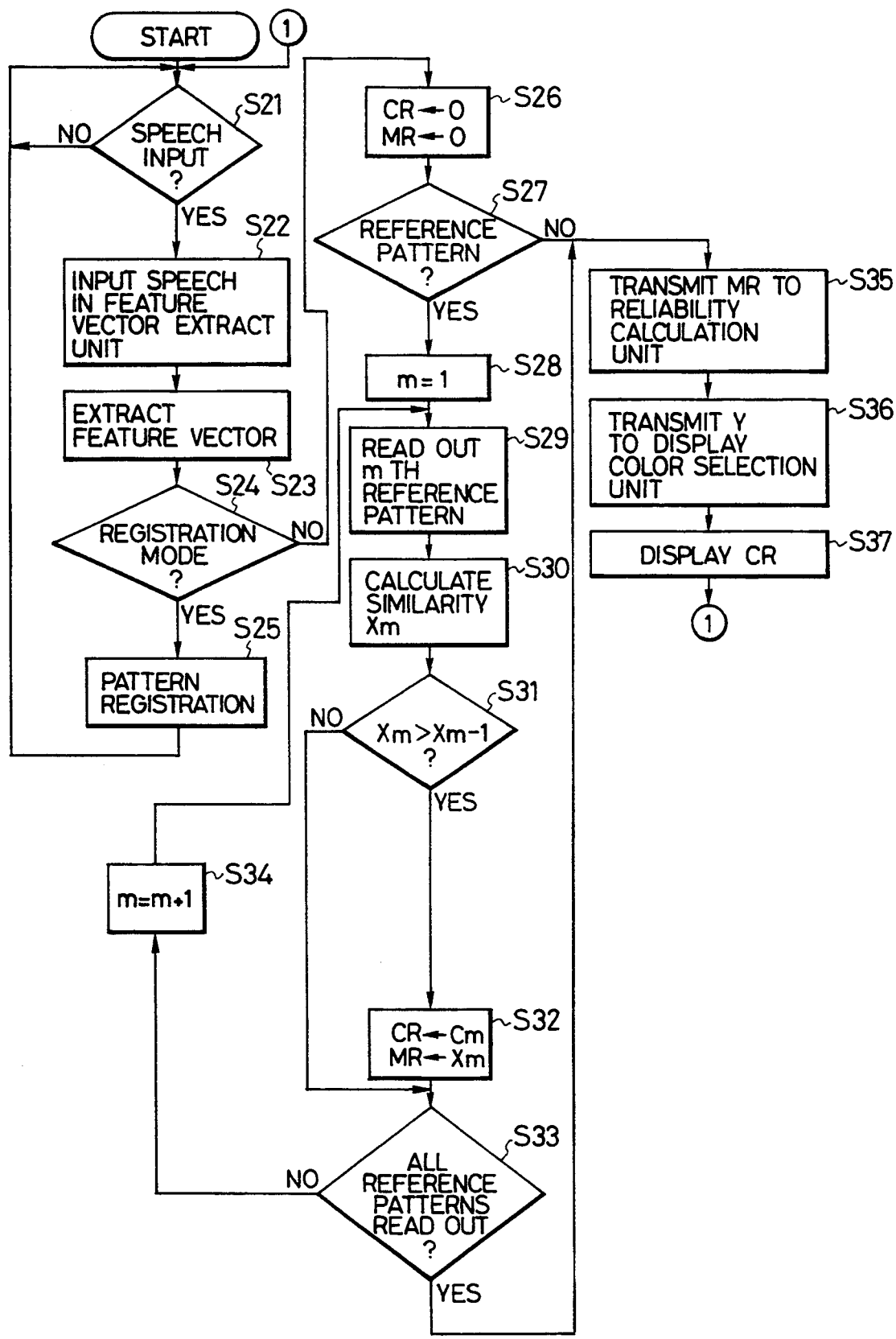
FIG. 4 is a flow chart for explaining the operation of a control unit shown in FIG. 3.

FIG. 3 is a block diagram showing an arrangement of the main function of a speech perception apparatus of another embodiment. In the diagram, the similar parts and components as those shown in FIG. 1 are designated by the same reference numerals and their descriptions are omitted. FIG. 4 is a flow chart showing the operation of a control unit in FIG. 3, in which steps S21 to S34 are respectively equal to steps S1 to S14 in FIG. 2; therefore, their descriptions are omitted.

A feature of this embodiment relates to a reliability calculation unit 10 of the perception. This similarity which is output from the speech perception unit 5 regarding a discrimination unit i of the same kind of phoneme or word which has been discriminated several times so far is stored in the reliability calculation unit 10. The reliability calculation unit 10 performs the weighted mean process for the time sequence data $X^i_m$, $X^i_{m-1}$, $X^i_{m-2}$, ..., $X^i_{m-n}$, thereby obtaining accuracy of the perception degree. The discrimination unit i denotes the utterance corresponding to a word of, e.g., "A". Or, instead of limiting to the same kind of discrimination unit, even in case of any phonemes or words in the sequence which appeared simply along the time sequence in the past, the similarities used for perception are mixed and may be calculated as reliably corresponding to a few similarities. In step S35, the content of the register MR is transmitted to the reliability calculation unit 10. Now, assuming that a weight coefficient of the discrimination unit i is $a^i$, a reliability Y of the speech perception at the present time is given by $$Y = \sum_{j=0}^{n} a^j \cdot X_{m-j} = a_0^i \cdot X_m^i + a_1^i \cdot X_{m-1}^i + \ldots + a_n^i \cdot X_{m-n}^i$$

The reliability calculation unit 10 outputs the present reliability $Y^i_m$ derived in this way to the display color selection unit 6 (instep S36). In the display color selection unit 6, for instance, the maximum value of the reliability is set to 100 and the display color is determined to be red when $Y^i_m$ lies between 0 to 59, yellow when $Y^i_m$ lies between 60 to 79, and blue when $Y^i_m$ lies between 80 to 100. This color selection information is transmitted to a color CRT display 11, thereby displaying the corresponding color (in step S37). In this display, for instance, the character or the like coded in the speech perception unit 5 is displayed directly as the colored indication. Thus, when the speech input is converted to the phoneme or word and is displayed, the person who utters can know the reliability of the perception from the color of that character. In general, the phonemes or words corresponding to the input speech will be constituted by blue characters. If a phoneme or word having low reliability is included in those phonemes or words, only that phoneme or word is displayed in yellow, so that the person who utters can know that attention should be paid to his utterance regarding that phoneme or word and the condition of the utterance can be corrected quickly. In addition, the characters which cannot be frequently recognized are displayed in red. For example, when the speech can be recognized, the corresponding phoneme or word is displayed in blue. If the speech cannot be recognized, a predetermined symbol representing that the perception is impossible is displayed in red. In this way, the person who utters can statistically grasp the condition of the speech perception. For example, if the weighting of a is set to a uniform value, reliability $Y^i_m$ will denote the average similarity of $(n+1)$ times in the past, so that the simple tendency of perception reliability can be grasped. Further, if the weight coefficient a is set such that a large weight is added as it approaches the recent result of perception, a better response sensitivity of perception reliability can be obtained as compared with the simple mean.

As described above, the person who utters can know the difficulty of speech perception at every time by the color. This color display is extremely convenient to notify the schematic condition of the perception. On the other hand, in an apparatus of the type which can display the recognized phoneme or word on the display and can confirm it, that character can be directly displayed as the colored character. Therefore, this method does not obstruct the implementation of the inherent processing object, but can know the difficulty of perception for every phoneme or word. The use of this method enables the person who utters to know the deviation of his utterance from his reference speech at a relatively early time, so that he can soon correct his utterance. Consequently, the apparatus can be operated with a high degree of perception and high reliability.

The present invention is not limited to the foregoing embodiments. Various changes and modifications are possible within the spirit and scope of the appended claims.

What is claimed is:

1. A speech recognition apparatus comprising:
    memory means for storing a plurality of reference speech data;
    input means for inputting ordinary speech data;
    deriving means, coupled to said input means and to said memory means, for comparing the input ordinary speech data with each of the stored plurality of reference speech data, and for deriving similarity data indicative of similarity between said ordinary speech data and said reference speech data in response to the comparing result;
    data generating means, coupled to said deriving means, for generating level data indicative of a level of said similarity data derived by said deriving means; and
    output control means for displaying a plurality of patterns in colors indicative of the level data indicative of a level of similarity between the reference speech data corresponding to the displayed patterns and the input ordinary speech data, wherein based on the color of one of the patterns displayed by said output control means, the one of the patterns can be discriminated from another of the patterns displayed together with the one of the patterns.

2. A speech recognition apparatus according to claim 1, further comprising means for storing said reference speech data.

3. A speech recognition apparatus according to claim 1, wherein said pattern comprises a character so that said pattern output means displays a character corresponding to said reference speech data in a color indicative of the level of similarity data generated by said data generating means.

4. A speech recognition apparatus according to claim 1, further comprising register means for comparing the input ordinary speech data and the plurality of reference speech data and registering the input ordinary speech data that is most similar to the plurality of reference speech data.

5. A speech recognition apparatus according to claim 4, wherein said pattern output means displays a pattern which is registered by said register means.

6. Apparatus according to claim 1, further comprising:
    switching means for switching said apparatus between a registration mode in which said apparatus registers reference speech data and a speech recognition mode in which said apparatus recognizes ordinary speech data.

7. A speech recognition apparatus according to claim 6, wherein said memory means stores a reference speech data in a registration mode.

8. A speech recognition apparatus according to claim 6, wherein said deriving means compare two speech data, and derives similarity data in a speech recognition mode.

9. A speech recognition apparatus according to claim 6, wherein said data generating means generates the data in a speech recognition mode.

10. A speech recognition apparatus comprising:
input means for inputting speech data;
deriving means for deriving similarity data indicative of similarity between said input speech data and a reference speech data;
value data generating means for weighting the plurality of similarity data derived by said deriving means based on prior recognition data of each reference speech data, thereby producing value data; and
pattern output means for displaying a plurality of patterns in colors indicative of the level of the value data of the reference speech data corresponding to the patterns, wherein based on the color of one of the patterns displayed by said pattern output means, the one of the patterns can be discriminated from another of the patterns displayed together with the one of the patterns.

11. A speech recognition method comprising the steps of:
inputting ordinary speech data into a speech recognition apparatus;
comparing the input ordinary speech data with each of a plurality of reference speech data stored in the speech recognition apparatus;
deriving similarity data indicative of the similarity between said input ordinary speech data and said reference speech data in response to the result of said comparing step;
generating level data indicative of a level of said similarity data derived in said deriving step; and
displaying a plurality of pattern characters in colors indicative of the level data indicative of a level of similarity between the input ordinary speech data and the reference speech data corresponding the displayed pattern, wherein based on the color of one of the pattern characters displayed in said displaying step, the one of the pattern characters can be discriminated from another of the pattern characters displayed together with the one of the pattern characters.

12. A speech recognition apparatus according to claim 10, wherein said pattern comprises a character so that said pattern output means displays a character corresponding to said reference speech data in a color indicative of the level of value data generated by said value data generating means.

13. A speech recognition method comprising the steps of:
storing a plurality of reference speech data in a speech recognition apparatus;
inputting ordinary speech data into the speech recognition apparatus;
comparing the input ordinary speech data with each of the stored plurality of reference speech data;
deriving similarity data indicative of the similarity between said input ordinary speech data and said reference speech data in response to the result of said comparing step;
generating level data indicative of a level of said similarity data derived in said deriving step; and
displaying a pattern character in a color indicative of the level data indicative of a level of similarity between the input ordinary speech data and the reference speech data corresponding the displayed pattern and.

14. A speech recognition method according to claim 13, wherein said displaying step comprises the step of displaying a character corresponding to said reference speech data in a color indicative of the level of similarity data generated in said data generating step.

15. A speech recognition method comprising the steps of:
inputting speech data into a speech recognition apparatus;
deriving similarity data indicative of the similarity between said input speech data and reference speech data;
processing a plurality of similarity data and a plurality of input speech data, and weighting the plurality of similarity data derived in said deriving step based on prior recognition data of each reference speech data, thereby producing value data; and
displaying a plurality of patterns in colors indicative of the level of the value data of the reference speech data corresponding to the patterns, wherein based on the color of one of the patterns displayed in said displaying step the one of the patterns can be discriminated from another of the patterns displayed together with the one of the patterns.

16. A speech recognition method according to claim 15, wherein said displaying step comprises the step of displaying a character corresponding to said reference speech data in a color indicative of the level of value data generated in said value data generating step.

* * * * *

UNITED STATES PATENT AND TRADEMARK OFFICE
CERTIFICATE OF CORRECTION

PATENT NO. : 5,359,695
DATED : October 25, 1994
INVENTOR(S) : Y. Ohora, et al.

It is certified that error appears in the above-indentified patent and that said Letters Patent is hereby corrected as shown below:

COLUMN 1

Line 19, "apparatuses," should read --apparatus,--.
Line 20, "patterns" should read --pattern--.
Line 38, "vector" should read --vector,--.
Line 57, "are" should read --is--.
Line 67, "utterance;" should read --utterance--.

COLUMN 2

Line 30, "operative" should read --good speech--.
Line 47, "OF" (first occurrence) should be deleted.

COLUMN 3

Line 20, "inputted," should read --input,--.

COLUMN 4

Line 35, "an" should be deleted.
Line 41, "an" should be deleted.
Line 45, "devote" should read --deviation--.

COLUMN 5

Line 17, "(instep" should read --(in step--.

UNITED STATES PATENT AND TRADEMARK OFFICE
CERTIFICATE OF CORRECTION

PATENT NO. : 5,359,695
DATED : October 25, 1994
INVENTOR(S) : Y. Ohora, et al.

It is certified that error appears in the above-indentified patent and that said Letters Patent is hereby corrected as shown below:

COLUMN 6

Line 34, "1," should read --10,--.
    Line 63, "compare" should read --compares--.

COLUMN 7

Line 36, "corresponding" should read --corresponding to--.

COLUMN 8

Lines 1-19, Claim 13 should be deleted and the following inserted therefor:

--13. A speech recognition apparatus according to claim 1, further comprising means for calculating the mean similarity of a plurality of said similarity data.--.
    Line 21, "13," should read --11,--.
    Line 41, "step" should read --step,--.

Signed and Sealed this

Ninth Day of May, 1995

*Attest:*

BRUCE LEHMAN

*Attesting Officer*    *Commissioner of Patents and Trademarks*